July 12, 1949.  R. POLLEAU  2,476,216
SELF-LOCKING TELESCOPIC STAND LEG
Filed April 15, 1947
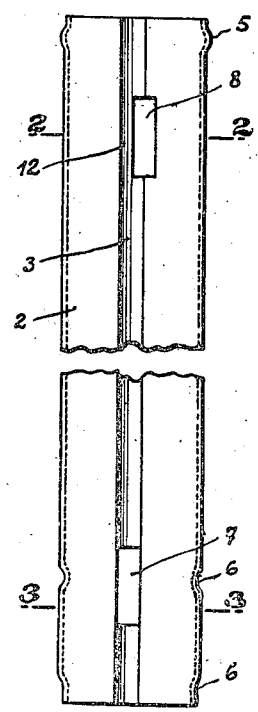
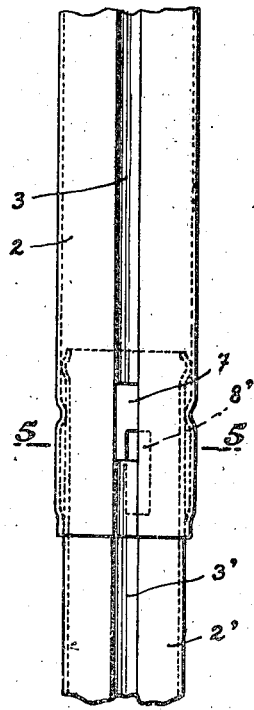
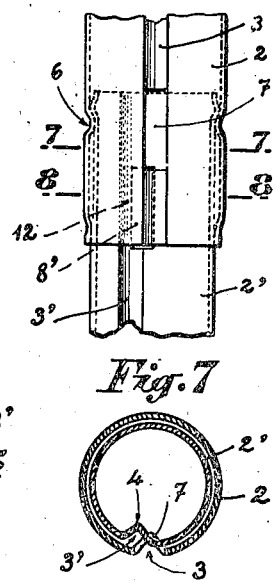
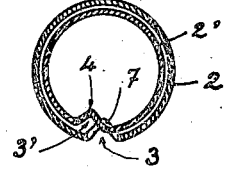
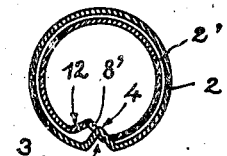
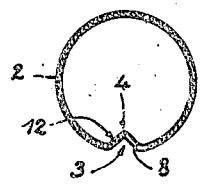
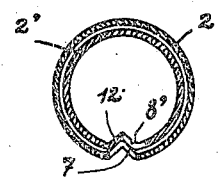
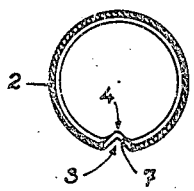
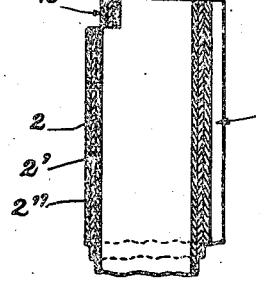
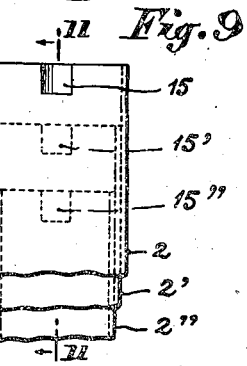
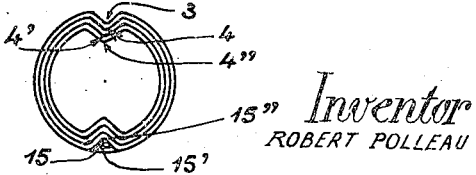
Inventor
ROBERT POLLEAU
By Otto Munk
HIS ATTY Patented July 12, 1949

2,476,216

UNITED STATES PATENT OFFICE 2,476,216

SELF-LOCKING TELESCOPIC STAND LEG

Robert Polleau, Moras-en-Valloire, France

Application April 15, 1947, Serial No. 741,613
In France October 29, 1940

Section 1, Public Law 690, August 8, 1946
Patent expires October 29, 1960

3 Claims. (Cl. 248—191)

1

Telescopic tubes are already on the market, that are used especially for the legs of cameras, in which the longitudinal ribs and grooves are enlarged cross-wise at one of their ends by being pressed out so as to allow, after the legs have been pulled out, the inner tube to turn slightly in relation to the outer tube, and thus cause the longitudinal locking of the tubes.

The stand that forms the object of my invention has the advantage over this system and other present standard types of a greater simplicity of manufacture and of allowing the employment of tubes of cold-drawn metal through the cutting out of all stamping operations that call for a high degree of accuracy.

This method is adapted to tubular stands of the type furnished with longitudinal grooves intended to act as guides when the various sections of the legs are pulled out, and it is characterized by the fact that the locking of the legs when pulled out is secured by means of notches or openings cut in the guiding ribs with a view to interrupting them at certain points so as to allow an angular shifting in each completed leg of one of the tubes with reference to the other by engagement of the remaining part of the rib considered in the notch or opening of the same length cut in the other tube section. Each tube then has two notches located respectively near each of its ends, one of the notches being slightly offset in reference to the axis of the rib with one of the edges of said notch on the axis of the rib, which retains in front of said notch one side wall that acts as a stop when the tube is turned the opposite way with a view to folding the leg and thus it allows the automatic realignment of the ribs of the different tubes.

The invention also covers as a new article of manufacture telescopic tubes incorporating such assembling means.

My invention may be understood more clearly with the assistance of the following description referring to the accompanying drawings, while naturally both the description and illustrations are submitted merely as exemplifications. In said drawings:

Fig. 1 is a front view of a tube in accordance with the invention.

Figs. 2 and 3 are cross-sectional views respectively through lines II—II and III—III of Fig. 1.

Fig. 4 is a front view showing two tube sections before being fully pulled out.

Fig. 5 is a cross-sectional view through line V—V of Fig. 4.

Fig. 6 is a front view showing two tube sections fully pulled out and in their locked position.

Figs. 7 and 8 are cross-sectional views respectively through lines VII—VII and VIII—VIII of Fig. 6.

Fig. 9 is an elevational view showing the stamped abutments pressed out at the top of the tubes to avoid their disengagement when the legs are folded up.

Fig. 10 is a plan thereof.

Fig. 11 is a view thereof in longitudinal section through line XI—XI of Fig. 9.

Each part of the telescopic tube or section 2 (Figs. 1 to 3) is furnished throughout its length with a groove 3 in the shape of a V forming on the inside of the tube a projecting part 4 of the same shape. It shows at its upper end a bulge 5 and at its lower end two indentations 6; the depth of the pressed parts 5 and 6 is equal to the difference in diameter between two consecutive tube sections, but the projecting part 4 formed by the groove is greater than this difference. Each tube shows an opening or notch 7 cut axially with reference to the groove 3 near its lower end, and a second opening or notch 8 offset with reference to the axis of the groove 3 and located near its upper end. The length of each of these openings or notches 7 and 8 must be respectively equal to or slightly greater than the length of the groove remaining unopened at the other end of the rib on the other side of the other notch.

Figs. 4 and 5 show the respective positions of these notches in two sections in place but not completely pulled out. The notch 7 of the bottom of the outer section and the notch 8' of the top of the inner section 2' partly coincide.

When these two sections are fully pulled out (Figs. 6 to 8) they may be locked by a slight turn. At this moment the projecting part 4 of the end of the outer section 2 engages the notch 8' of the inner section 2', thus constituting a perfect longitudinal locking in both directions, this turning being permitted by the notch 7 of the outer tube 2 that is open for the entrance of the end of the inner tube 2' located beyond the notch 8'.

On the other hand, when the two sections are turned in the opposite way to release them, the remaining wall 12 of the groove located in front of the notch 8' abuts against the corresponding wall of the part 4' of the inner tube and ensures the automatic realignment of the grooves 3 and 3' of the tubes 2, 2'.

In order to provide that the different parts, once they are nested inside each other, do not move out of one another upwards, provision has been made at the top of each section, preferably on the side opposite the groove 3, of a depression 15 that is deeper than the difference between the tubes and of such a shape that the depressions 15, 15', 15" of the various sections 2, 2', 2" may be nested inside each other and engage one another without any loss of length (Fig. 11).

Obviously and as apparent from the foregoing, the invention is in no way restricted to a single form of execution as outlined above, any more than the particular form illustrated for its various component parts, but on the contrary it covers all the possible modifications thereof. The grooves instead of being pressed inwardly could just as well be pressed outwardly and these grooves could be given a shape different from V-shape.

What I claim is:

1. In a telescopic leg chiefly for camera stands, the combination of two interengaging tube sections each provided with an inwardly directed stamped longitudinal guiding portion fitting inside the guiding portion in the other tube and with longitudinal openings registering for one of the sections with a fractional length of the guiding portion therein and shifted laterally for the second section with reference to a fractional length of the corresponding guiding portion and partly overlapping same, the terminal distance between the ends of each tube section facing the other section and the nearest end of the opening in the sections considered being smaller than the length of the opening in the other section for allowing the projection through each opening of the terminal part of the guiding portion in the other section, the first opening allowing a small angular shifting of the guiding portion engaging it and the second opening leaving a fraction of the stamped guiding portion unaltered along its side to serve as an abutment for the guiding portion of the cooperating tube section.

2. In a telescopic leg chiefly for camera stands, the combination of two interengaging tube sections each provided with an inwardly directed stamped longitudinal guiding portion fitting inside the guiding portion in the other tube and with longitudinal openings registering for one of the sections with a fractional length of the guiding portion therein and shifted laterally for the second section with reference to a fractional length of the corresponding guiding portion and partly overlapping same, the terminal distance between the ends of each tube section facing the other section and the nearest end of the opening in the sections considered being smaller than the length of the opening in the other section for allowing the projection through each opening of the terminal part of the guiding portion in the other section and means defining the outer relative position of the two sections.

3. A telescopic leg for camera stands comprising a series of interengaging tubes each provided with an inwardly directed stamped longitudinal guiding portion, the guiding portion of one tube fitting inside the guiding portion of the next tube, each tube being provided with longitudinal openings at a small distance from their ends and registering for one end of the tube with a corresponding length of the guiding portion therein and shifted for the other end with reference to a fractional length of the guiding portion while overlapping same, the solid lengths of the guiding portions beyond the openings being shorter than the openings at the cooperating end of the adjacent tube.

ROBERT POLLEAU.

REFERENCES CITED

The following references are of record in the file of this patent:

FOREIGN PATENTS

| Number | Country | Date |
| --- | --- | --- |
| 581,685 | Germany | Sept. 2, 1933 |